Figure 1:
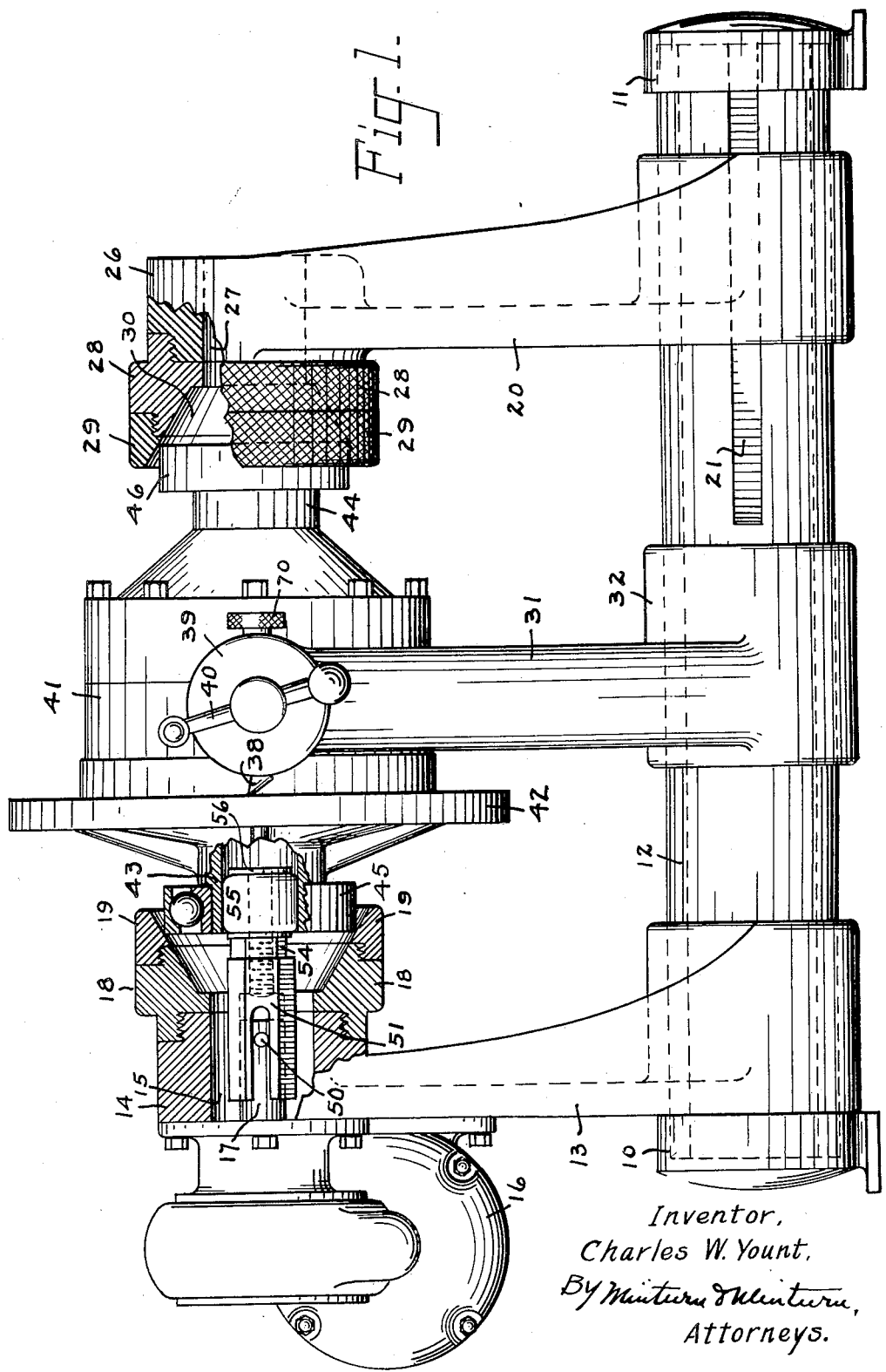

Oct. 10, 1933.　　　　C. W. YOUNT　　　　1,929,800
DIFFERENTIAL ASSEMBLY GEAR FLANGE INDICATING AND CORRECTING DEVICE
Filed Dec. 3, 1931　　　3 Sheets-Sheet 1

Inventor,
Charles W. Yount,
By Minturn & Minturn,
Attorneys.

Oct. 10, 1933.  C. W. YOUNT  1,929,800
DIFFERENTIAL ASSEMBLY GEAR FLANGE INDICATING AND CORRECTING DEVICE
Filed Dec. 3, 1931  3 Sheets-Sheet 2

Inventor,
Charles W. Yount,
By Minturn & Minturn,
Attorneys.

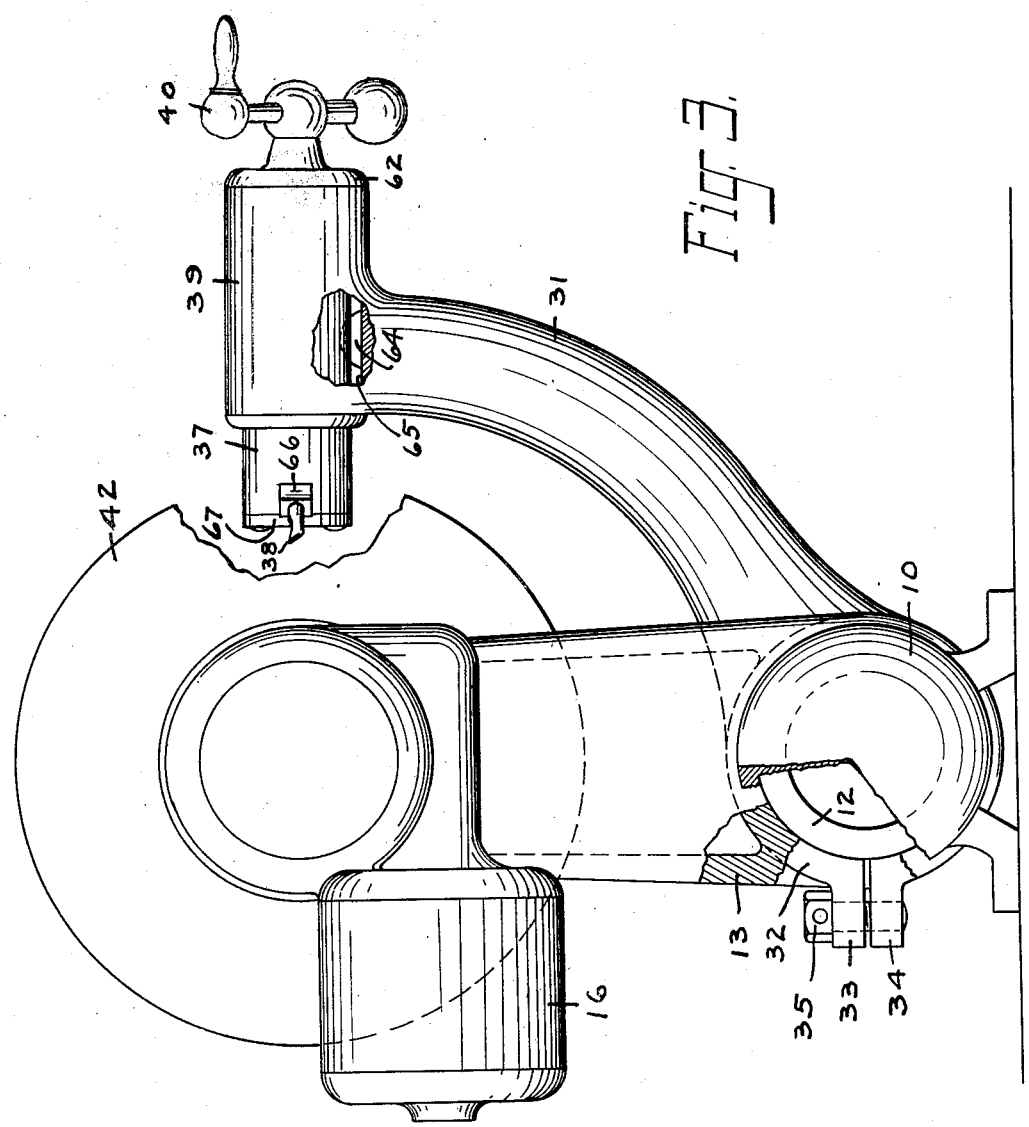

Patented Oct. 10, 1933

1,929,800

UNITED STATES PATENT OFFICE 1,929,800

DIFFERENTIAL ASSEMBLY GEAR FLANGE INDICATING AND CORRECTING DEVICE

Charles W. Yount, Indianapolis, Ind.

Application December 3, 1931. Serial No. 578,714

14 Claims. (Cl. 82—2)

This invention relates to a device for determining the variations from a normal plane of a ring gear flange on a rear axle differential assembly and also for correcting such variations. In the rear axle is commonly employed a differential assembly between the wheel driving shafts and on this differential assembly is mounted a gear by means of rivets. A pinion gear is held in mesh with this gear whereby power is transmitted from the engine to revolve the pinion gear and in turn the gear on the differential assembly. It frequently happens that one or more teeth will break on this larger or ring gear which is secured to the differential assembly or in some cases a tooth will break on the pinion gear with the result that in any event one or both of the gears is damaged to such an extent that they must be replaced. Generally when a tooth breaks on either one of the gears, the gears will spread apart one from the other sufficiently to bend or distort the flange on the differential assembly to which the ring gear is attached. Many repair shops have placed a new gear directly on this flange only to find that when the assembly has been returned to the axle, the pinion and ring gears do not properly mesh and a decided noise arises.

The differential assembly is mounted as a unit to be carried by bearings at either end, usually ball bearings or roller bearings, and it is between these bearings that the differential assembly must be revolved under actual working conditions in the axle of the automobile. Unless the gear attaching flange on the differential assembly has a face against which the gear is secured to be entirely within a plane at right angles to the axis of rotation as determined by these bearings, it is impossible to secure a quiet operation of the pinion and ring gear.

It is a primary purpose of my invention to provide a structure which will universally receive and rotatably support a differential assembly and its supporting bearings whereby the assembly may be revolved between these bearings exactly as it would be under actual working conditions in the automobile.

An important object of the invention is to provided a structure that will not only receive and hold the differential assembly revolubly but to provide such a structure that will not necessitate the removal of the supporting bearings carried by the differential assembly.

A further important object of the invention is to provide means which will receive and support the differential assembly bearings without having to adjust a chuck or other similar devices thereto and which will automatically center the bearings to permit the differential assembly to be revolved on its true axis of rotation as determined by these bearings.

A further object of the invention is to provide means for revolving the differential assembly, which means may be quickly engaged with and removed from the assembly and which will be adapted for use in the full range of assemblies to be found in practice.

A still further object of the invention is to provide not only a structure as above indicated but to incorporate therein means for truing the surface to which the ring gear is to be fitted and secured without having to move the assembly to a separate machine, and still further to provide means for checking upon the plane of the gear after it is attached to that surface.

Figure 2:
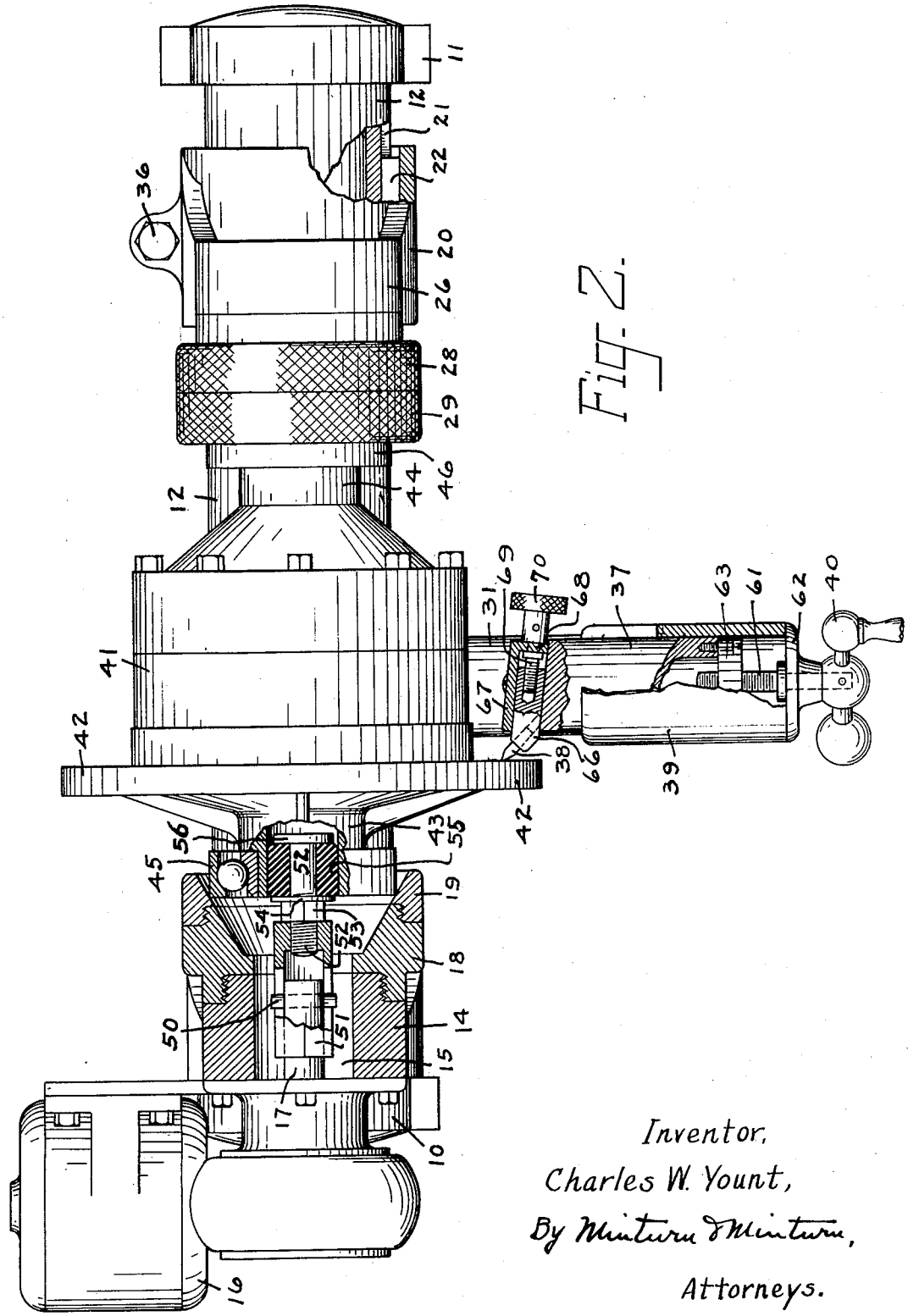

These and other objects and advantages will become apparent in the following description of the invention as illustrated by the accompanying drawings, in which Fig. 1 is a fragmentary side elevation of a structure embodying my invention;

Fig. 2, a fragmentary top plan view and

Fig. 3, a fragmentary left hand elevation.

Like characters of reference indicate like parts in the several views in the drawings.

I secure the supporting brackets 10 and 11 on the respective ends of a length of steel tubing 12 whereby the tubing 12 is held by these brackets in a fixed position. A head standard 13 is mounted on the tube 12 to have its lower end surround and be fixed to the tube whereby the standard will be maintained in a vertical upright position. This standard 13 carries a head 14 on its upper end through which is a horizontally disposed bore 15. An electric motor 16 is secured to the outer side of the standard 13 and has a reduction gear fitted thereto from which a final drive shaft 17 extends axially for a distance into the bore 15. The motor 16 and its reduction gear may be of any suitable type and the exact details of its construction do not enter into my invention.

The inner and right-hand side of the head 14 is screwthreaded about its periphery to receive thereon the collar 18. This collar 18 has a bore through its portion adjacent the head 14 forming a continuation of the bore 15 but the outer portion of the collar 18 is counterbored conically to have the wall of the counterbore at an angle with the axis of substantially 30 degrees. A second collar 19 is provided to screwthreadedly engage with the collar 18 and is formed to have the hole therethrough form a continuation of the counterbore in the collar 18 when the collar 19 is drawn up snugly thereagainst whereby there is no shoulder or step therebetween.

A tail standard 20 has its lower end slidably mounted about the tube 12. A key-way 21 is cut longitudinally in the outer side of the tube 12 and a key 22 is fixed in the standard to slide along this key-way as the standard 20 may be shifted along the tube 12. The key 22 maintains the standard 20 in a vertical upright position to prevent rotation of the standard 20 about the tube 12. The upper end of the standard 20 carries a head 26 through which is a horizontal bore 27, the axis of which bore coincides with the bore 15 in the head 14. A collar 28 corresponding to the collar 18 is screwthreadedly attached to the inner or left hand side of the head 26 and a second collar 29 is provided to screwthreadedly engage on the left hand side of the collar 28. A conical bore 30 is provided in the collar 28 and the collar 29 is provided with a bore which is a continuation of the bore 30. The conical bore through these two collars provides a sloping wall therearound having an angle of substantially 30 degrees.

Between the standards 13 and 20 I place a tool holder arm 31 which has a foot 32 surrounding the tube 12 in such a manner that the foot may be moved longitudinally of the tube 12 and also rotatably therearound. The foot 32 is split along one side and has ears 33 and 34 above and below the split with a clamp screw 35 passing through the ears as a means for holding the foot 32 in a fixed position on the tube 12. The standard 20 is likewise secured at any longitudinal position along the tube 12 by means of the clamp screw 36, Fig. 2.

The numeral 41 generally designates a differential assembly of the usual type incorporated in an automobile axle which has a ring gear mounting flange 42 extending annularly therearound. The assembly has the usual extending trunnions 43 and 44 which are hollow to permit the insertion therethrough of the wheel driving shafts (not shown). Bearings 45 and 46 respectively, here shown as ball bearings, are fixed by their inner races on the respective trunnions 43 and 44 and the entire differential assembly may revolve in these bearings by holding the outer races thereof stationary. The differential assembly 41 is disassembled from its axle with these bearings 45 and 46 in place and to remove these bearings from the assembly would mean that considerable risk is occasioned by reason of the liability of breaking some part of the bearing. Moreover it is not desirable to remove the bearings from the differential assembly since these are the bearings which actually support the assembly in its working position and to substitute other bearings therefor would introduce some condition affecting the axis of rotation that would be absent when the assembly is in actual use.

I leave the bearings 45 and 46 in their normal positions and bring the entire assembly 41 to my device to place the bearing 45 within the counterbore of the collar 19 or collar 18 as the diameter of the outer race of the bearing 45 permits. The ring 19 is only provided to take care of the larger sizes of bearings so that the greater range of sizes of bearings will permit the bearing to come within the collar 18. With the assembly supported by hand to have the bearing 45 within the bore of the ring 19 as above indicated, the tail standard 20 is shifted along the tube 12 from the bracket 11 to bring the conical bore through the collars 29 and 28 up over the bearing 46. The axes of the conical bores in the collars 18, 19, 28, 29 are exactly at the same elevation and in a common plane. The outer edges of the outer races of the bearings 45 and 46 will form a line contact with the conical counterbores in the respective collars and thus locate and retain the bearings in vertical positions perpendicular to the axes through the conical bores. The tail standard 20 is carried toward the differential assembly sufficiently to insure the bearings 45 and 46 being roughly seated in their respective collars and the standard is fixed in that position by tightening the clamp screw 36. The collar 29, or 28 as the case may be, is then revolved on its threads to be advanced toward the race of the bearing 46 to press thereagainst and firmly seat the races of both bearings 45 and 46 in their respective collars. The differential assembly 41 is then free to be revolved about its normal axis of rotation on the supporting bearings 45 and 46, the axis being exactly parallel to the axis of the tube 12.

In order to revolve the assembly 41 by means of the motor 16, I provide a unique interconnecting driving connection which I shall now describe. The shaft 17 which extends into the bore 15 and is revolved at a relatively low speed by the motor 16, is provided with a pin 50 extending transversely therethrough toward its outer end to have an end extend somewhat beyond each side of the shaft. I form a sleeve 51, here shown as having an outer hexagonal surface, to slide freely longitudinally over the shaft 17. The sleeve 51 is slotted on opposite sides so as to straddle the pin 50. The other end of the sleeve 51 screwthreadedly receives therein the screw 52 which carries first a locknut 53 screwthreadedly thereon then a washer 54, a length of compressible rubber 55 and an outer head 56. This rubber 55 has an outer cylindrical surface of a diameter which will permit it to be inserted within the central opening in the end of the trunnion 43 with a sliding fit so that by turning the sleeve 51 and the nut 54 about the screw 52, the rubber will be compressed between the washer 54 and the head 56 to cause the rubber 55 to swell out into compressive contact with the inner side of the trunnion 43 and thereby grip it whereby the rubber can not be revolved therewithin.

The rubber 55 is thus positioned within the end of the trunnion 43 before the assembly 41 is mounted between the heads of the standards 13 and 20 and the sleeve 51 is slipped over the shaft 17 when the assembly 41 is brought up to have the bearing 45 entering in the collar 19. It is thus to be seen that upon revolution of the shaft 17, the sleeve 51 will be revolved therewith and in turn through the pressure of the rubber 55 against the wall of the trunnion 43, revolve the entire assembly 41 accordingly. Even though the shaft 17 may not be exactly aligned with the axis of the differential assembly no trouble is encountered since the driving connection described provides an elastic universal connection.

The tool arm 31 is then shifted longitudinally and rotatably on the tube 12 to bring the tool 38 up adjacent the side of the flange 42 against which the ring gear (not shown) is to be carried. Now by having the motor 16 in operation, the assembly 41 is revolved to carry the flange 42 around past the tool 38 whereby variations from the true plane normal to the axis of rotation may be observed and the face of the flange 42 turned down by the tool 38 to bring it to the true plane. Of course an indicator of any type well known to those versed in the art may be mounted on the tool holder to give an indication of the amount the flange 42 varies from the true plane.

The arm 31 is clamped to the tube 12 by the screw 35 when the tool 38 is approximately in the proper cutting position. The upper end of the arm 31 carries a head 39 in which a slide 37 is carried to be movable at right angles to the axis of rotation of the differential assembly. This slide 37 is moved in the head by turning the handle 40 which is fixed on the outer end of the screw 61 which is rotatably carried by the cap 62 and screwthreadedly passes through the nut 63 mounted on the slide 37. A key 64 fixed in the slide on its under side (Fig. 3) slidably engages in the slot 65 in the head 39. The outer end of the slide 37 directed toward the differential assembly is slotted transversely across its end to carry the tool holder 66 slidably across the slot. A plate 67 is attached to the end of the slide to cover over the holder to retain the holder within the slot. A leg 68 extends from the plate 67 to within the slot toward the right hand end thereof and rotatably receives therethrough the screw 69, the outer end of which is fixed in the head 70.

The screw 69 has a collar abutting the inner face of the leg 68 and extends along the slot in the slide and screwthreadedly engages with the holder 67 whereby suitable rotation of the head 70 will advance or retract the holder in the slot. The outer end of the holder is bored through at an angle to provide a hole into which the tool 38 may be inserted and held in the proper cutting position. Thus by turning the head 70, the tool 38 is properly adjusted for depth of cut and by turning the handle 40, the tool 38 is fed across the face of the flange 42, all in a very simple, effective manner.

It is thus to be seen that with the structure I have herein described the differential assembly may be rotatably supported without having to remove the supporting bearings from the assembly and without having to adjust chucks or the like in an attempt to center the assembly to have it revolve on its true axis, and in the same device that I have provided means for detecting and correcting any variation found. It is obvious that after the ring gear has been assembled and fixed in place on the flange 42, the assembly with this gear may be returned to my device and the gear itself checked to determine whether or not any variation from the true plane has been occasioned while the gear was being riveted to the flange.

While I have here shown and described my invention in the one form as now best known to me, it is obvious that structural changes may be made without departing from the spirit of the invention and I therefore do not desire to be limited to that precise form beyond the limitations as may be imposed by the following claims.

I claim:

1. For indicating and correcting a ring gear attaching flange on a differential assembly having bearings mounted on hollow trunnions, a head standard, a tail standard, one of said standards being movable linearly in respect to the other, and a differential assembly bearing receiving cup on each of said standards, each cup having outwardly flaring internal walls conically disposed opposing each other about a common axis, a driving member inserted within one of said trunnions, an expansible member between the trunnion and driving member and means for expanding said expansible member.

2. For indicating and correcting a ring gear attaching flange on a differential assembly having bearings mounted on hollow trunnions, a head standard, a tail standard, one of said standards being movable linearly in respect to the other, and a differential assembly bearing receiving cup on each of said standards, each cup having outwardly flaring internal walls conically disposed opposing each other about a common axis a driving member inserted within one of said trunnions, an expansible member between the trunnion and driving member and means for expanding said expansible member, a member interconnecting said standards along which said one standard may be shifted, and a tool holder arm carried by said member to be shiftable therealong and rocked thereabout.

3. For indicating and correcting a ring gear attaching flange on a differential assembly, a head standard, a tail standard, one of said standards being movable linearly in respect to the other, and a differential assembly bearing receiving cup on each of said standards, each cup having outwardly flaring internal walls conically disposed opposing each other about a common axis, one of said cups having a bore extending axially therefrom, a drive shaft accessible through said bore, a sleeve adapted to be inserted through said bore to engage said shaft in driving relation, and a laterally expansile and retractile member carried by the sleeve adapted to be entered into said assembly as a driving member.

4. For indicating and correcting a ring gear attaching flange on a differential assembly having anti-friction bearings carried on hollow trunnions, a head standard, a tail standard, a horizontally disposed member carrying said standards, a head on each standard having an outwardly flaring conical bore directed toward the other bore, said bores being on a common axis, said head standard being fixed to said member and said tail standard being shiftable along the member, a drive shaft directed toward the bore in said head standard, a sleeve adapted to pass through the bore and slidably engage said shaft, said shaft having a pin projecting from a side thereof to enter an elongated slot in the sleeve whereby said sleeve may be rotated in an extended or retracted position by the shaft, and a yielding member connected with said sleeve, said yielding member being formed to enter one of said trunnions to engage the inner wall thereof, said bores being adapted to receive and support said bearings therein, and a tool arm mounted on said standard carrying member to be shiftable therealong and rockably therearound.

5. In a device for indicating and correcting a ring gear attaching flange on a differential assembly having bearings mounted on hollow trunnions, a pair of standards, recesses in the standards adapted to receive and locate said bearings whereby the assembly may revolve about its true axis of rotation, a driving rubber adapted to be inserted within one of said trunnions, means for expanding said rubber, and a tool holder adjustably supported to be shiftable both parallel and normal to said axis.

6. In a device for indicating and correcting a ring gear attaching flange on a differential assembly having bearings mounted on hollow trunnions, a pair of standards, recesses in the standards adapted to receive and locate said bearings whereby the assembly may revolve about its true axis of rotation, a driving member adapted to be inserted within one of said trunnions, means for expanding said member, and a tool holder adjustably supported to be shiftable both parallel and normal to said axis, a motor carried by one of the standards, and a shaft driven by the motor slidably engaging with said driving member in driving relation therewith.

7. In a device for indicating and correcting a ring gear mounting flange on a differential assembly having bearings with outer revoluble races and mounted on hollow trunnions, a pair of standards having conical recesses into which said outer races may be entered and be automatically centered by moving one standard toward the other to carry said races against the walls of the recesses and rotatably mount said assembly therebetween, a driving member inserted within one of said trunnions, an expansible member between the trunnions and driving member and means for expanding said expansible member.

8. In a device for indicating and correcting a ring gear mounting flange on a differential assembly having bearings with outer revoluble races and mounted on hollow trunnions, a pair of standards having conical recesses into which said outer races may be entered and be automatically centered by moving one standard toward the other to carry said races against the walls of the recesses and rotatably mount said assembly therebetween, a driving member inserted within one of said trunnions, an expansible member between the trunnions and driving member and means for expanding said expansible member, and means for engaging said assembly through one of said trunnions by which the assembly may be revolved upon said races, comprising a driving member inserted within one of said trunnions, an expansible member between the trunnion and driving member and means for expanding the expansible member.

9. In a device for indicating and correcting a ring gear mounting flange on a differential assembly having bearings with outer revoluble races and mounted on hollow trunnions, a pair of standards having conical recesses into which said outer races may be entered and be automatically centered by moving one standard toward the other to carry said races against the walls of the recesses and rotatably mount said assembly therebetween, a driving member inserted within one of said trunnions, an expansible member between the trunnions and driving member and means for expanding said expansible member, and means for engaging said assembly through one of said trunnions by which the assembly may be revolved upon said races, comprising a driving member inserted within one of said trunnions, an expansible member between the trunnion and driving member and means for expanding the expansible member, a longitudinal member on which said standards are supported, said longitudinal member being parallel to the common axis of said conical recesses, and a tool member carried on said longitudinal member to be shiftable therealong.

10. A device of the nature described embodying in combination, a cylindrical member horizontally supported, a head standard fixed to the member in an upright position at one end thereof, a tail standard having a foot slidingly engaging about the member, key means cooperating between the member and the tail standard retaining the standard in a vertical upright position whereby the standard may be shifted along the member without rocking from said upright position, a tool arm having a foot slidingly fitting about said member to permit the arm to be shifted therealong and therearound, a clamp for securing the arm in fixed positions on the member, a head on each of the standards carrying an opposing outwardly flaring conical bore, a driving shaft, an expandable driving member, and an extension therefrom adapted to be passed through one of said conical bores and driven by the shaft.

11. For correcting a ring gear attaching flange on a differential assembly, a head standard, a tail standard, a supporting member holding the standards, means for rotating the assembly under relative conditions resulting from previous use, a tool arm carried by the supporting member to be shiftable therealong, a slide carried by the arm, an axial screw engaging the slide to be revolved as a means for advancing or retracting the slide, a tool holder slidably carried across an end of the slide, and an axial screw engaging the holder to be revolved as a means for advancing and retracting the holder transversely of the travel of the slide.

12. For correcting a ring gear attaching flange on a differential assembly, a head standard, a tail standard, a supporting member holding the standards, a tool arm carried by the supporting member to be shiftable therealong, a slide carried by the arm, an axial screw engaging the slide to be revolved as a means for advancing or retracting the slide, a tool holder slidably carried across an end of the slide, and an axial screw engaging the holder to be revolved as a means for advancing and retracting the holder transversely of the travel of the slide, said tool arm being rockably carried by said supporting member, and means for clamping the arm in selected positions longitudinally and rotatably about the member.

13. For indicating and correcting a ring gear attaching flange on a differential assembly rotated on hollow trunnions, a head standard, a tail standard, one of said standards being movable linearly in respect to the other, and a differential assembly bearing receiving cup on each of said standards, each cup having outwardly flaring internal walls conically disposed opposing each other about a common axis, one of said cups being adapted to be advanced and retracted toward and away from the other cup independently of the movement of its supporting standard, a motor, and universally adjustable means for connecting the motor with the interior of a hollow trunnion.

14. In a device for indicating and correcting a ring gear mounting flange on a differential assembly having bearings with outer revoluble races and mounted on hollow trunnions, a pair of standards having conical recesses into which said outer races may be entered and be automatically centered by moving one standard toward the other to carry said races against the walls of the recesses and rotatably mount said assembly therebetween, a collar carried by one of the standards having one of said conical recesses therein, and means for advancing or retracting said collar independently of movement of the standards, a motor, and universally adjustable means for connecting the motor with the interior of a hollow trunnion.

CHARLES W. YOUNT.